W. DAY.
SEED PLANTER.
APPLICATION FILED JAN. 21, 1913.

1,075,817.

Patented Oct. 14, 1913.

2 SHEETS—SHEET 1.

Witnesses
Louis R. Heinrichs

Inventor
William Day
By Victor J. Evans
Attorney

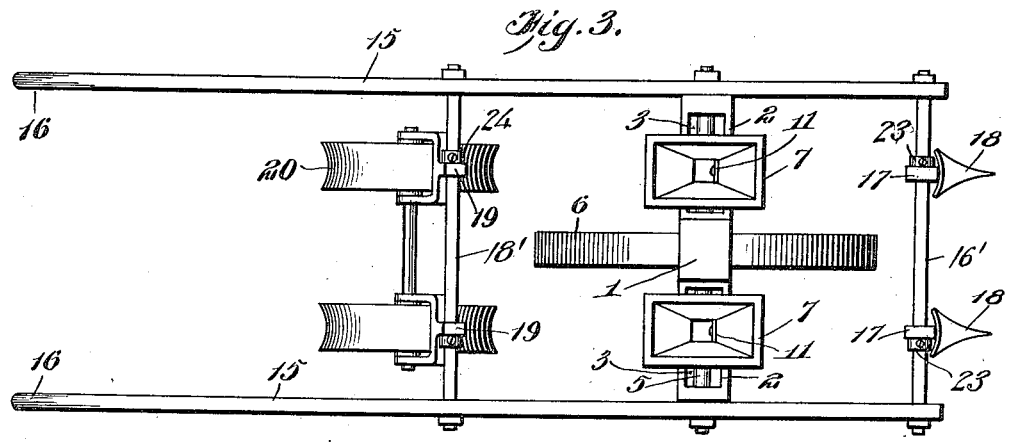
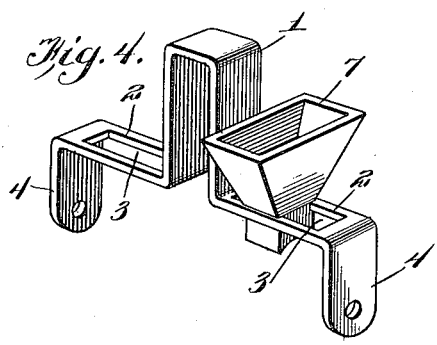
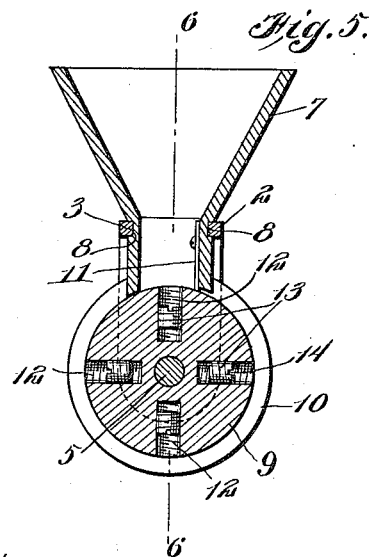
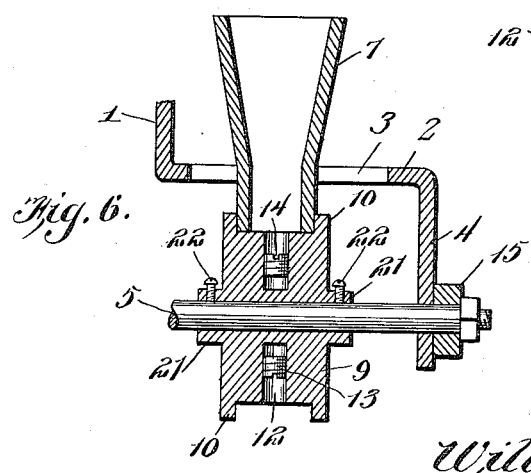

UNITED STATES PATENT OFFICE.

WILLIAM DAY, OF HORNBY ISLAND, BRITISH COLUMBIA, CANADA.

SEED-PLANTER.

1,075,817.   Specification of Letters Patent.   Patented Oct. 14, 1913.

Application filed January 21, 1913.   Serial No. 743,369.

*To all whom it may concern:*

Be it known that I, WILLIAM DAY, a subject of the King of Great Britain, residing at Hornby Island, in the Province of British Columbia and Dominion of Canada, have invented new and useful Improvements in Seed-Planters, of which the following is a specification.

This invention relates to seed planters, and it has for its object to produce a seed planter of simple and improved construction whereby seed may be deposited in parallel rows and whereby the distance between the rows may be easily and conveniently varied.

A further object of the invention is to produce a frame of simple and improved construction upon which seed containers or hoppers are movably supported, in connection with a shaft having a supporting wheel on which seed drums or cylinders are movably supported, said drums being associated with the hoppers and adjustable therewith.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the claims may be resorted to when desired.

Figure 1:
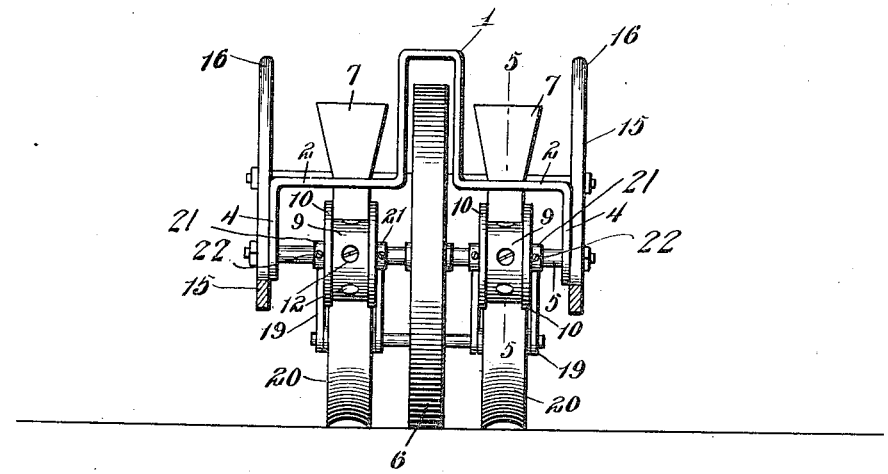
Figure 2:
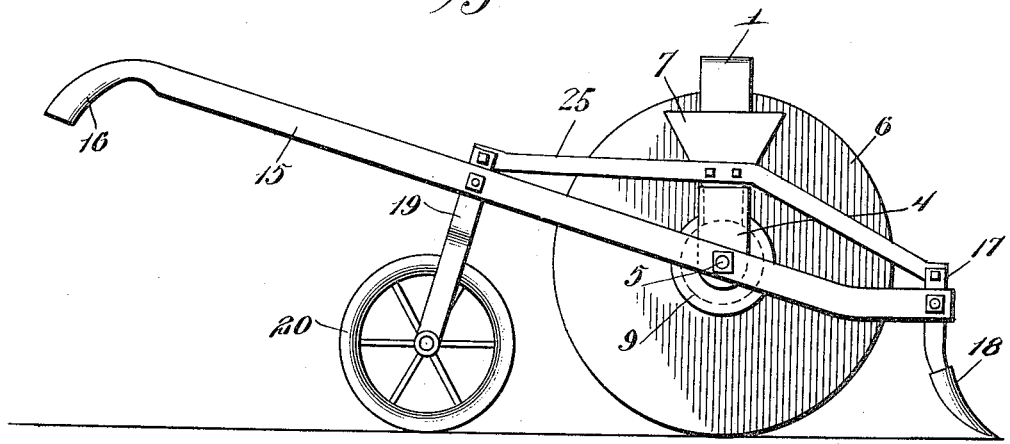

In the drawings,—Figure 1 is a front view of a seed planter constructed in accordance with the invention. Fig. 2 is a side elevation of the same. Fig. 3 is a top plan view. Fig. 4 is a perspective detail view of the frame and one of the hoppers. Fig. 5 is a sectional detail view taken on the line 5—5 in Fig. 1. Fig. 6 is a vertical transverse sectional detail view taken on the line 6—6 in Fig. 5.

Corresponding parts in the several figures are denoted by like characters of reference.

The frame of the improved planter includes a center arch 1, each limb of which is provided with a laterally extending bracket 2 having a slot 3. Each of said brackets supports at its outer extremity a downwardly extending lug 4, said lugs being apertured to form bearings for a shaft 5 carrying a ground wheel 6, the upper portion of which is accommodated between the side members of the center arch, as shown.

Suitable hoppers or seed containers 7 are provided, and the front and rear walls of said hoppers are provided on their outer faces with grooves 8 engaging the front and rear walls of the slots 3 in the brackets 2 of the frame, said hoppers being thus slidably supported for lateral adjustment.

Slidably supported on the shaft or axle 5 adjacent to the two sides of the ground wheel 6 are drums 9 provided with flanges 10 between which the lower ends of the hoppers 7 are fitted, the side walls of said hoppers being provided with arcuate recesses of a radius corresponding with that of the drums. The lower extremities of the front and rear walls of the hoppers are fitted snugly against the faces of the drums, and the rear side wall of each hopper is preferably provided with a brush or cut-off 11 of rubber or other suitable flexible material or of any other construction that may be deemed desirable.

Each of the drums 9 is provided with a plurality of radial pockets 12 which may be of varying diameters and of any suitable depth, said pockets being equipped with externally threaded plugs 13 having notches 14 at their outer ends to receive the point of a screw driver or other tool, whereby said plugs may be adjusted. It is evident that by properly adjusting these plugs, the depth of the pockets may be varied for the purpose of receiving varying quantities of seed. By having the pockets of various diameters, a pocket of larger diameter may be used when large seeds are to be planted, while pockets of small diameter may be used for small seeds. Pockets not in present use may be entirely obstructed by moving the plugs outwardly until the outer ends of said plugs lie flush with the surface of the drum.

The frame is provided with side bars 15, the rear ends of which form handles 16 that may be grasped by the operator. The forward ends of the side bars are connected together by a front cross bar 16' serving to support standards 17 carrying the furrow openers 18. The side bars 15 are also connected together by a rear cross bar 18' equipped with standards 19, said standards being arranged to the rear of the ground wheel and carrying covering devices, such as wheels 20. These covering wheels may also be used to support the machine when turning at the end of a row or when for any reason it shall be desired to interrupt the planting, when by bearing downwardly on the handles, the side bars 15 may be tilted so as to elevate the ground wheel and related parts from the ground.

Each of the drums 9 is preferably provided with a hub 21 having shaft engaging set screws 22, whereby the drums may be secured in adjusted position. It will be readily seen that when the set screws are loosened the drums may be slid or moved longitudinally of the shaft or axle 5. The hoppers, the lower ends of which are fitted between the flanges 10 of the drums, will thus be adjusted simultaneously with the drums, the hoppers being supported slidably, as hereinbefore described, by means of the slotted bracket members 2. Provision may also be made for the lateral adjustment of the furrow openers and the covering wheels. This may be in the nature of clamps 23, 24, whereby the standards 17 and 19 are secured adjustably on the cross bars of the frame, as indicated in Fig. 3, it being assumed that the standards are so mounted as to be capable of sliding on the cross bars 16' and 18' for lateral adjustment with respect to the frame. Each of the hoppers 7 may also be connected with a furrow opener standard 17 in front thereof and with a coverer standard 19 in rear thereof by means of a longitudinal frame bar or arm 25, as seen in Fig. 2 of the drawings. When such construction is resorted to the furrow openers and the coverers will be adjusted simultaneously with the hoppers, and will thus be kept properly in alinement with said hoppers at all times. It will thus be seen that the distance between the rows planted by the implement may be varied and that the desired adjustments may be easily and quickly effected. The machine may also be quickly adjusted for planting various kinds of seed in any desired quantities.

When the machine is in operation the seed will enter into the unobstructed pockets of the drums and will be carried by the latter past the cut-off members or brushes, whereby surplus seed is removed, the remaining contents of the pockets being discharged into the furrows previously prepared. Ordinary seed ducts may be used to convey the seed from the hopper to the furrow, but are not considered necessary or essential.

The improved implement is simple in construction, efficient in operation and capable of being manufactured and marketed at a very reasonable expense.

Having thus described the invention, what is claimed as new, is:—

1. In a seed planter, a frame having a center arch, slotted brackets extending laterally from the lower ends of the limbs of the center arch, lugs supported at the outer ends of the brackets, a wheel carrying axle journaled in said lugs, hoppers supported slidably in the slots of the brackets, and drums supported slidably on the axle, said drums having flanges between which the lower ends of the hoppers are fitted.

2. In a seed planter, a frame including a center arch having laterally extending brackets provided with slots, and with downturned terminal lugs, a ground wheel carrying axle journaled in the lugs, annularly flanged seed drums slidable on the axle, means for securing the drums in adjusted position, seed hoppers supported slidably on the slotted brackets, the lower ends of said hoppers being fitted between the flanges of the drums, side bars connected with the center arch, front and rear cross bars, and furrow openers and covering devices supported by the front and rear cross bars.

3. In a seed planter, a seed drum supported for rotation and for lateral adjustment and having circumferential flanges, seed receiving pockets in said drum, lugs adjustable in said pockets, and a movably supported hopper, the lower end of which is fitted between the flanges of the drum.

4. In a seed planter, a revolving shaft, a drum slidable on said shaft and having radial seed receiving pockets, and plugs adjustable therein, said drum being provided with annular flanges, a slidably supported hopper, the lower end of which is fitted between the annular flanges of the drum, and a cut-off within the hopper engaging the face of the drum.

5. In a seed planter, a frame structure including a center arch having laterally extending brackets, side bars and front and rear cross bars, a ground wheel carrying shaft, annularly flanged seed drums slidable on said shaft, means for securing the drums in adjusted position with respect to the shaft, hoppers mounted slidably on the laterally extending brackets of the center arch, the lower ends of said hoppers being fitted between the flanges of the drums, blade carrying standards laterally adjustable on the front cross bar, standards laterally adjustable on the rear cross bar and having covering devices associated therewith, and means whereby each hopper is connected with a standard in front thereof and with another standard in rear thereof, said front and rear standards being adjustable with the hopper and with the seed drum engaged thereby.

In testimony whereof I affix my signature in presence of two witnesses.

WILLIAM DAY.

Witnesses:
J. B. COLVARD,
G. C. WOODWARD.

Copies of this patent may be obtained for five cents each, by addressing the "Commissioner of Patents, Washington, D. C."